(12) United States Patent
Shiohara

(10) Patent No.: US 12,282,693 B2
(45) Date of Patent: Apr. 22, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Tetsuya Shiohara, Nagano (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/358,821

(22) Filed: Jul. 25, 2023

(65) Prior Publication Data
US 2024/0036783 A1 Feb. 1, 2024

(30) Foreign Application Priority Data
Jul. 29, 2022 (JP) .................................. 2022-121181

(51) Int. Cl.
*G06F 3/12* (2006.01)
*G06K 15/02* (2006.01)

(52) U.S. Cl.
CPC .......... *G06F 3/1224* (2013.01); *G06F 3/1205* (2013.01); *G06F 3/1284* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 6,259,532 B1* | 7/2001 | Yaple .................... | G06F 13/385 358/1.15 |
| 2011/0093621 A1* | 4/2011 | Aritomi ................ | H04L 12/282 710/12 |
| 2011/0173309 A1* | 7/2011 | Igarashi .............. | H04L 41/0213 709/223 |
| 2012/0069366 A1* | 3/2012 | Heffner ................ | G06F 3/1225 358/1.15 |
| 2017/0163844 A1* | 6/2017 | Yagi .................... | H04N 1/00965 |
| 2018/0321888 A1* | 11/2018 | Rosemann ............ | G06F 3/1248 |
| 2019/0317706 A1* | 10/2019 | Osada .................... | G06F 3/1226 |
| 2021/0026580 A1* | 1/2021 | Nakamura ............ | G06F 3/1285 |
| 2021/0042063 A1* | 2/2021 | Suzuki ............... | H04N 1/00477 |
| 2021/0165612 A1* | 6/2021 | Takahashi ............... | G06F 3/126 |

FOREIGN PATENT DOCUMENTS

| | | | | |
|---|---|---|---|---|
| JP | 2005275730 | * | 10/2005 | ............. G06F 11/00 |
| JP | 2010211706 | * | 9/2010 | ............. G06F 3/12 |
| JP | 2010231266 | * | 10/2010 | ............. G06F 3/12 |

(Continued)

*Primary Examiner* — Beniyam Menberu
(74) *Attorney, Agent, or Firm* — Canon U.S.A., Inc. IP Division

(57) ABSTRACT

An information processing apparatus including an application that extends a function provided by print data generation software used in common by a plurality of different printing apparatuses includes one or more memories, and a processor in communication with the one or more memories, wherein the one or more memories and the processor are configured to acquire information regarding a printing form of a printing apparatus connected to the information processing apparatus, and cause a display unit to display a screen having a different configuration based on the acquired information.

14 Claims, 17 Drawing Sheets

(56) References Cited

FOREIGN PATENT DOCUMENTS

| JP | 2012073918 | * | 4/2012 | ............. G06F 13/10 |
| JP | 2019074906 A | | 5/2019 | |
| JP | 2020015265 A | | 1/2020 | |
| JP | 2022089133 A | | 6/2022 | |
| WO | WO 2021131981 | * | 7/2021 | ............. B41J 29/38 |

* cited by examiner

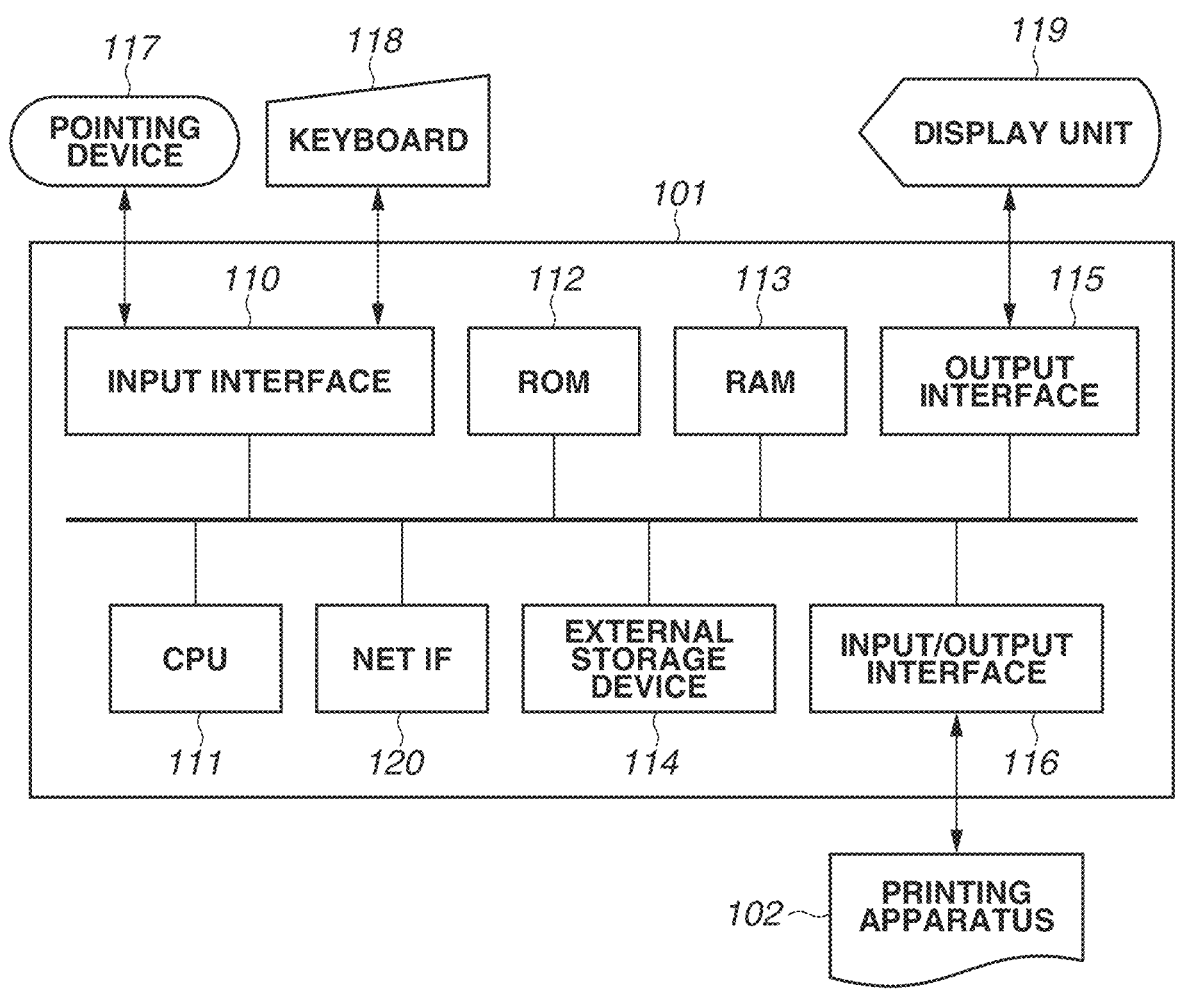

FIG.5A

- 500 (close)
- 501 (info)

TYPE OF SHEET
PLAIN PAPER ⌄ — 502

SHEET SIZE
A4 ⌄ — 503

ORIENTATION OF PRINTING
● PORTRAIT  ○ LANDSCAPE — 504

SHEET TRAY
AUTOMATIC SELECTION ⌄ — 505

☑ PRINT FROM LAST PAGE — 506
☐ MARGINLESS — 507

TWO-SIDED PRINTING
ONE-SIDED PRINTING ⌄ — 508

510 CANCEL    509 OK

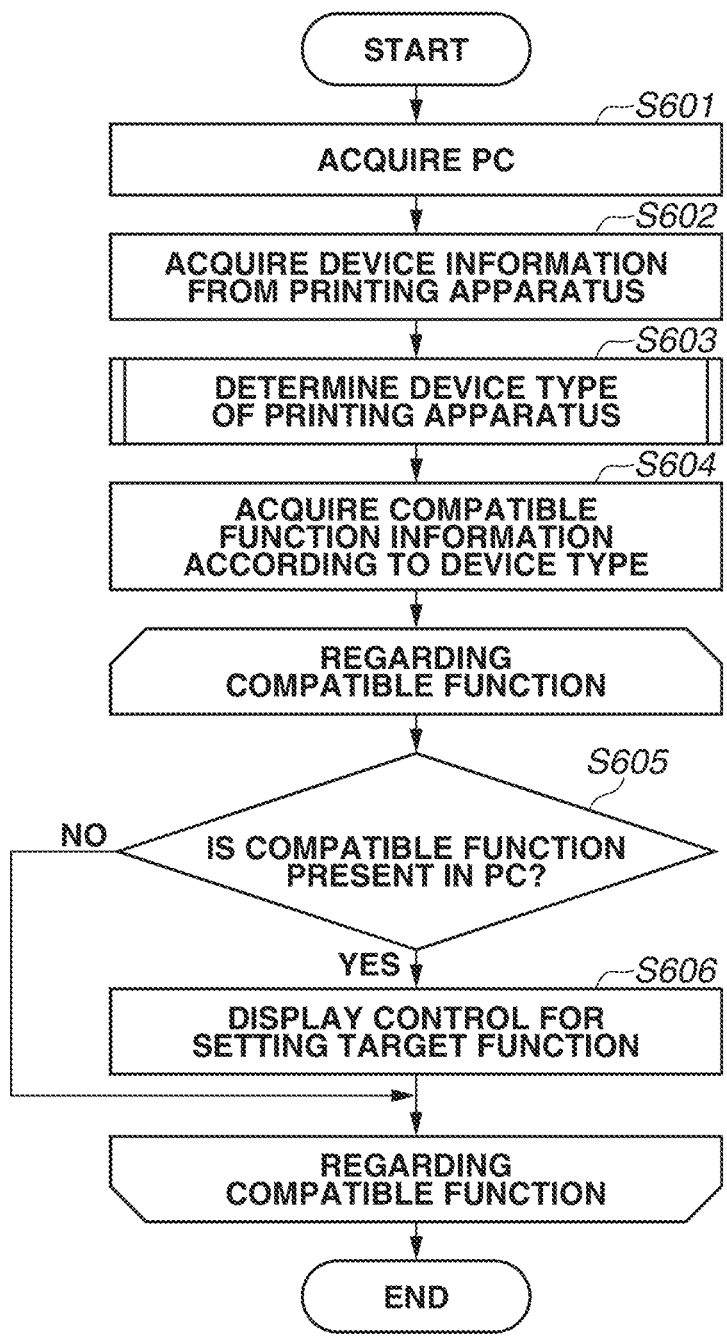

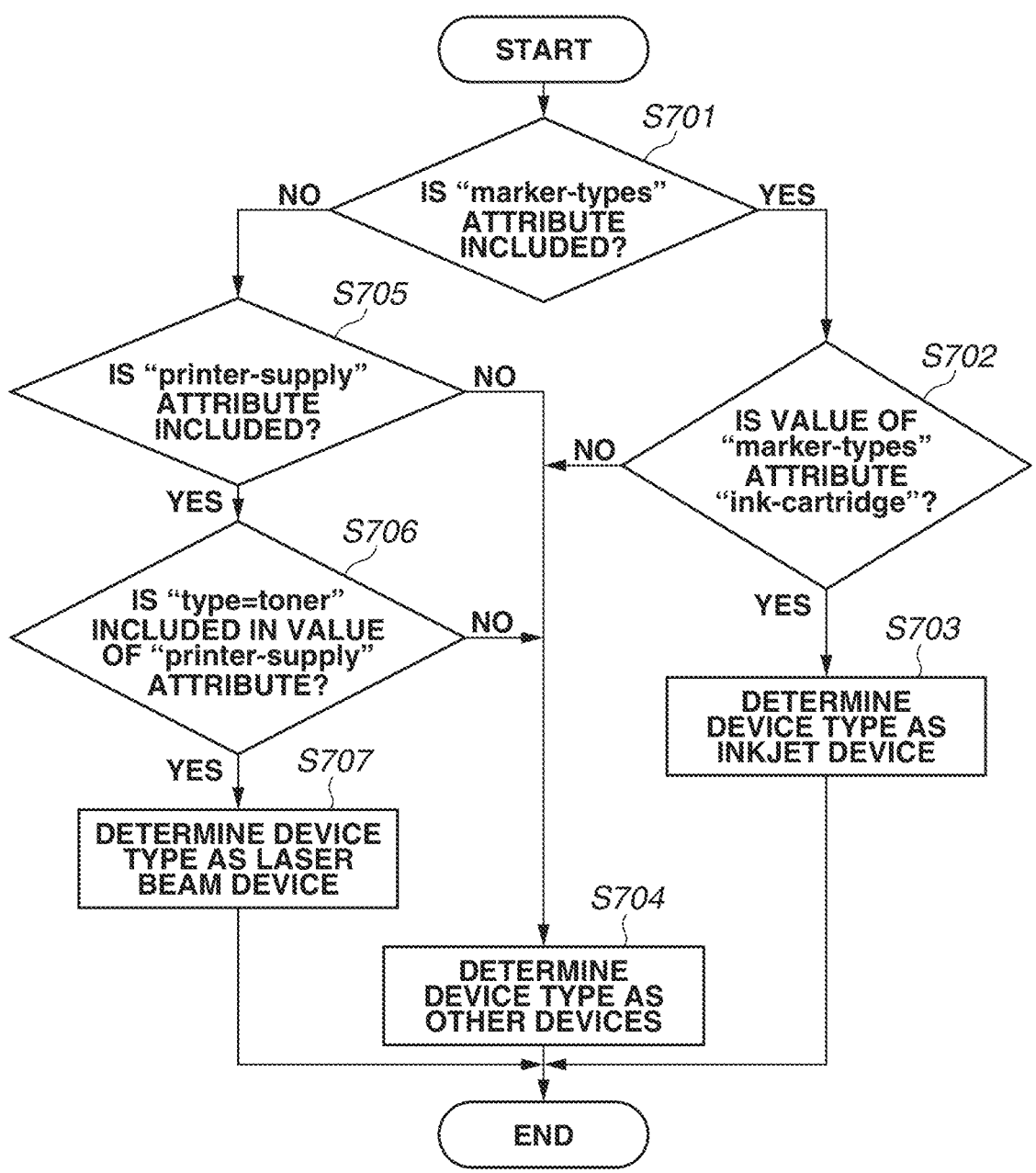

FIG.8

```
<psf:PrintCapabilities ...>
 <psf:Feature name="psk:PageMediaSize">
  ...
  <psf:Option name="psk:NorthAmericaLetter" constrained="psk:None">
   <psf:ScoredProperty name="psk:MediaSizeWidth">
    <psf:Value xsi:type="xsd:integer">215900</psf:Value>
   </psf:ScoredProperty>
   <psf:ScoredProperty name="psk:MediaSizeHeight">
    <psf:Value xsi:type="xsd:integer">279400</psf:Value>
   </psf:ScoredProperty>
  </psf:Option>
  <psf:Option name="psk:NorthAmericaLetter" constrained="psk:None">
   <psf:ScoredProperty name="psk:ISO A4">
    <psf:Value xsi:type="xsd:integer">210000</psf:Value>
   </psf:ScoredProperty>
   <psf:ScoredProperty name="psk:MediaSizeHeight">
    <psf:Value xsi:type="xsd:integer">297000</psf:Value>
   </psf:ScoredProperty>
  </psf:Option>
 </psf:Feature>
 <psf:Feature name="psk:PageMediaType">
  ...
  <psf:Option name="psk:Plain" constrained="psk:None"/>
  <psf:Option name="psk:PhotoPaper" constrained="psk:None"/>
 </psf:Feature>
 <psf:Feature name="psk:PageOrientation">
  ...
  <psf:Option name="psk:Portlait" constrained="psk:None"/>
  <psf:Option name="psk:Landscape" constrained="psk:None"/>
 </psf:Feature>
 <psf:Feature name="psk:JobNUpAllDocumentsContiguously">
  <psf:Option name="ns0000:None" constrained="psk:None"/>
  <psf:Option name="ns0000:PagePerSheet_2" constrained="psk:None"/>
  <psf:Option name="ns0000:PagePerSheet_4" constrained="psk:None"/>
 </psf:Feature>
 ...
</psf:PrintCapabilities>
```

FIG.13

| PRINTER TYPE | PRINTER NAME |
|---|---|
| REMOTE UI-COMPATIBLE | Printer A |
| | Printer B |
| | Printer C |
| TANK MODEL | Printer B |
| | Printer C |
| SUBSCRIPTION-INCOMPATIBLE MODEL | Printer A |
| | Printer D |

FIG.14

| INKJET DEVICE | LASER BEAM DEVICE | OTHER DEVICES |
|---|---|---|
| TYPE OF SHEET | SHEET SIZE | TYPE OF SHEET |
| SHEET SIZE | ORIENTATION OF PRINTING | SHEET SIZE |
| ORIENTATION OF PRINTING | TYPE OF SHEET | ORIENTATION OF PRINTING |
| SHEET TRAY | SHEET TRAY | SHEET TRAY |
| REVERSE ORDER PRINTING | PRINT BY EXPANDING PRINTING AREA | |
| MARGINLESS PRINTING | STAPLING | |
| TWO-SIDED PRINTING | PUNCHING | |
| | TWO-SIDED PRINTING | |

FIG.15

| STATUS | INKJET DEVICE | LASER BEAM DEVICE |
|---|---|---|
| DURING PRINTING | NOW PRINTING. | NOW PRINTING. |
| SHEET ABSENCE ERROR | SHEETS RUN OUT. IT IS NECESSARY TO SET SHEETS. | THERE IS SHEET FEEDING UNIT WITHOUT SHEETS. |
| INK EMPTY | INK MAY HAVE RUN OUT. | — |
| TONER EMPTY | — | TONER MAY HAVE RUN OUT. |
| OTHER ERRORS | ERROR HAS OCCURRED. PLEASE CONFIRM STATE OF PRINTER. | ERROR HAS OCCURRED. PLEASE CONFIRM STATE OF PRINTER. |

1501

INFORMATION PROCESSING APPARATUS, INFORMATION PROCESSING METHOD, AND STORAGE MEDIUM

BACKGROUND

Field

The present disclosure relates to an information processing apparatus, an information processing method, and a storage medium.

Description of the Related Art

A configuration is known in which, using a printer driver installed on a host computer as software for controlling a printing apparatus, a print instruction is given to a printing apparatus connected to the host computer. An operating system (OS) as basic software is installed on the host computer, and the printer driver is configured according to specifications defined by the OS, is called by the OS, and operates. A vendor who provides a printing apparatus provides a printer driver adapted to the specifications of the OS and thereby can provide a method for instructing the printing apparatus to perform printing using the OS.

In recent years, in Windows (registered trademark), a standard class driver that can be used in common by printing apparatuses provided by a plurality of vendors (hereinafter also referred to as a "standard driver") is provided. Such a standard driver is included in the package of the OS and can be easily used by connecting any printing apparatus to the host computer. Thus, it is not necessary to separately install a model-specific printer driver suitable for a printing apparatus, which is convenient. The standard driver is configured to specify print functions according to PrintDeviceCapabilities (hereinafter, "PDC") generated based on information acquired from a printing apparatus connected to the standard driver. Consequently, a user who uses the standard driver can specify print functions according to the capabilities of a printing apparatus connected to the standard driver even though the user uses a single standard driver.

The standard driver can be associated with an application for extending a function (hereinafter also referred to as an "extension application"). The extension application can be provided by a vendor who provides a printing apparatus. By editing PDC generated by the standard driver, the extension application can provide a function that cannot be achieved by the standard driver alone (an extension function). The publication of Japanese Patent Application Laid-Open No. 2019-74906 discusses a technique for extending a function such as a stamp function by an extension application.

The extension application in the publication of Japanese Patent Application Laid-Open No. 2019-74906 can edit a spool file. For example, the extension application can achieve a layout printing function by editing the spool file. What is needed is an appropriate user interface (UI) which sufficiently exerts the function of the extension application that extends the function of the standard driver.

SUMMARY

According to an aspect of the present disclosure, an information processing apparatus including an application that extends a function provided by print data generation software used in common by a plurality of different printing apparatuses includes one or more memories, and a processor in communication with the one or more memories, wherein the one or more memories and the processor are configured to acquire information regarding a printing form of a printing apparatus connected to the information processing apparatus, and cause a display unit to display a screen having a different configuration based on the acquired information.

Further features of the present disclosure will become apparent from the following description of exemplary embodiments with reference to the attached drawings.

BRIEF DESCRIPTION OF THE DRAWINGS

FIG. 1 is a block diagram illustrating a hardware configuration of a printing system.

FIGS. 5A and 5B are diagrams illustrating examples of a print setting screen displayed by a print setting screen extension unit.

FIG. 6 is a diagram illustrating a processing flow of display of a print setting screen performed by the print setting screen extension unit.

FIG. 7 is a diagram illustrating a flow of a determination of a device type of a printing apparatus.

FIG. 8 is a diagram illustrating an example of PrintCapabilities (PC) generated by print data generation software.

FIG. 13 is a diagram illustrating an example of the display determination information.

FIG. 14 is a diagram illustrating an example of compatible function information.

FIG. 15 is a diagram illustrating an example of status message information.

DESCRIPTION OF THE EMBODIMENTS

Figure 2A:
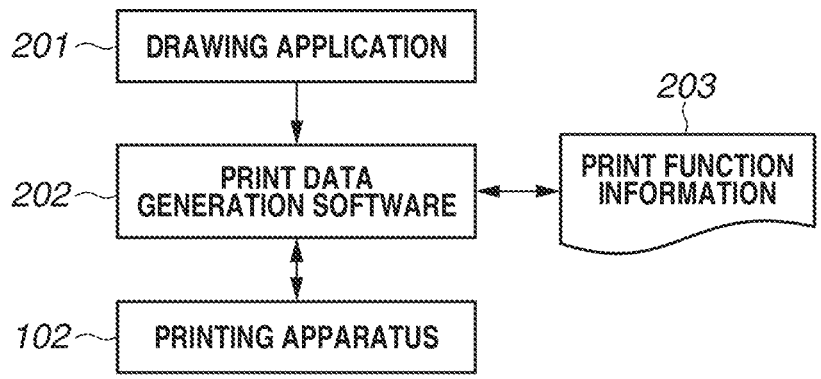
FIGS. 2A and 2B are diagrams illustrating a software configuration of the printing system.

With reference to the attached drawings, suitable exemplary embodiments of the present disclosure will be described in detail below. The following exemplary embodiments do not limit the present disclosure according to the appended claims, and not all the combinations of the features described in the exemplary embodiments are essential for a method for solving the issues in the present disclosure.

The same component is designated by the same reference number, and is not repeatedly described.

Hardware Configuration of Printing System

FIG. 1 is a block diagram illustrating the hardware configuration of a printing system. In FIG. 1, a host computer 101 is an example of an information processing apparatus and includes an input interface 110, a central processing unit (CPU) 111, a read-only memory (ROM) 112, a random-access memory (RAM) 113, an external storage device 114, an output interface 115, and an input/output interface 116. To the input interface 110, input devices such as a keyboard 118 and a pointing device 117 are connected.

To the output interface 115, a display device such as a display unit 119 is connected. A network interface (NET IF) 120 performs control to transfer data to and from an external device via a network.

The ROM 112 stores an initialization program. The external storage device 114 stores a group of application programs, an operating system (OS), print data generation software, and various other types of data. The RAM 113 is used as a work memory for executing various programs stored in the external storage device 114, and the various programs can operate in the host computer 101.

In the present exemplary embodiment, the functions of the host computer 101 described below and processing regarding flowcharts described below are executed by the CPU 111 performing processing according to the procedure of a program stored in the ROM 112. A printing apparatus 102, which is a device, is connected to the host computer 101 via the input/output interface 116. Although the host computer 101 and the printing apparatus 102 are separately configured, the host computer 101 and the printing apparatus 102 may be configured as a single information processing apparatus. Although the printing apparatus 102 is described using as an example an inkjet printer that performs printing by discharging ink onto a paper surface, printing may be executed using another method (e.g., an electrophotographic method). The host computer 101 may be a desktop personal computer, a smartphone, or a laptop personal computer.

Configuration of Printing System Centered on Software

Figure 2B:
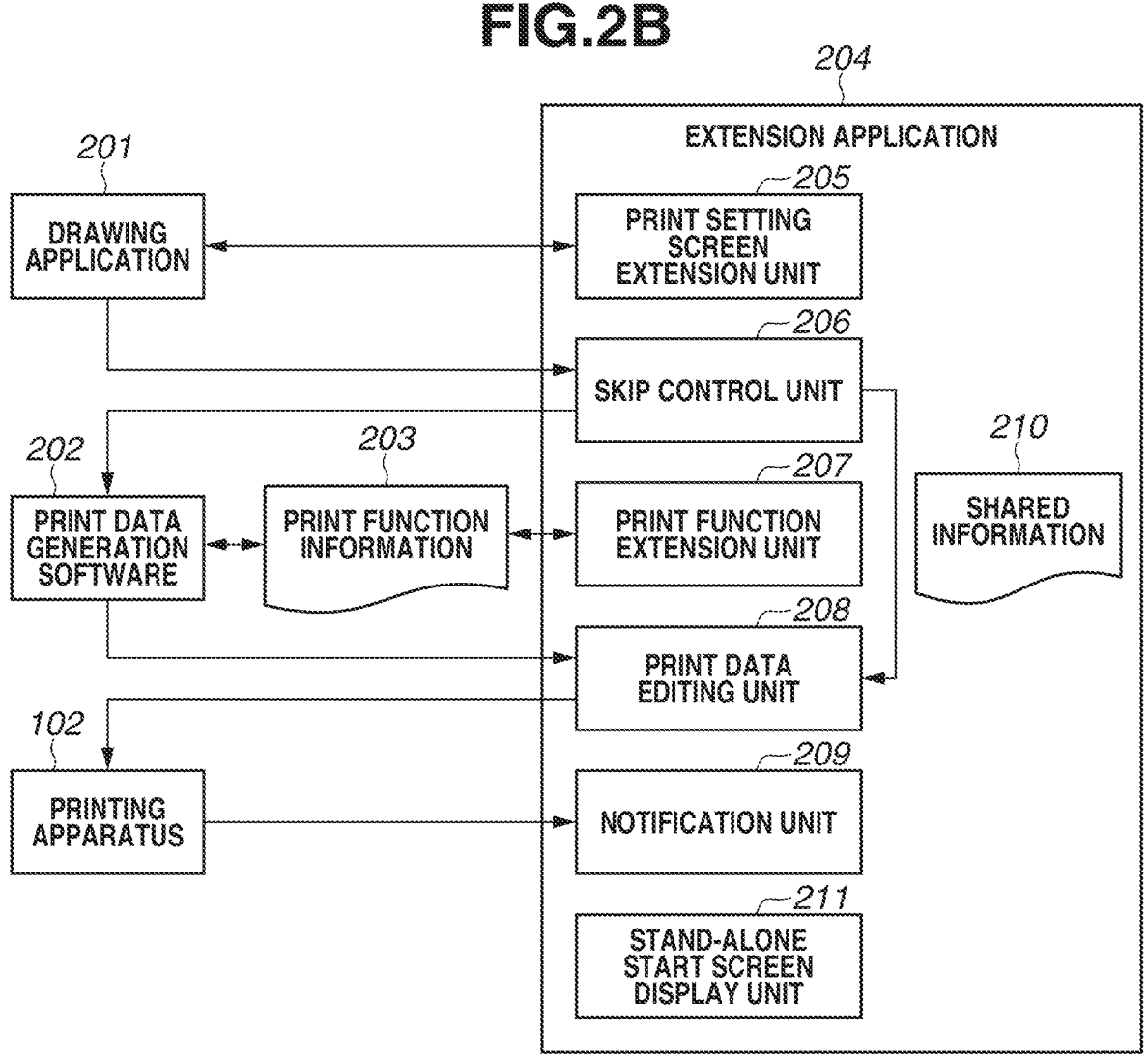

FIGS. 2A and 2B are diagrams schematically illustrating the software configuration of the printing system. A description is given on the premise of the printing system using the host computer 101 having Windows (registered trademark) 11 by Microsoft (registered trademark) as the OS.

FIG. 2A is a diagram illustrating the general configuration in a case where an extension application 204 is not associated with print data generation software 202 and the printing apparatus 102. A drawing application 201 is software that creates a content to be printed (drawing data). For example, the drawing application 201 corresponds to a document creation application or a spreadsheet application. If the drawing application 201 receives a print request from a user, the drawing application 201 issues a print instruction to the OS.

The print instruction includes print setting information for instructing the print data generation software 202 and the printing apparatus 102 to operate. The print setting information is also referred to as "PrintTicket" (hereinafter, "PT").

To output the print setting information, the drawing application 201 can display a print setting screen provided by any of the print data generation software 202, the OS, and the drawing application 201. According to capability information (information that can be set as print settings) acquired from the print data generation software 202, the print setting screen includes setting items (hereinafter also referred to as "control items") indicating print functions that can be set, and control items indicating the setting values of the print functions. The capability information is also referred to as "PrintCapabilities" (hereinafter, "PC").

Based on print function information 203, the print data generation software 202 determines PC. The print function information 203 is data indicating all print functions that can be set, the setting values of all the print functions, and print functions for which the exclusion relationships between the setting values of the print functions are described. The print function information 203 is also referred to as "Print Device Capabilities (PDC)". The PDC 203 is included in a configuration file of the print data generation software 202 and placed as an unchangeable file in the external storage device 114. Alternatively, the PDC 203 can also be dynamically generated by the print data generation software 202. Specifically, the print data generation software 202 or the OS can be configured to acquire attribute data of the printing apparatus 102 from the printing apparatus 102 and generate the PDC 203 according to attribute information in the acquired attribute data. In a case where the PDC 203 is dynamically generated, the generated PDC 203 can be edited. The attribute data of the printing apparatus 102 acquired from the printing apparatus 102 is a response acquired by issuing a Get-Printer-Attributes operation in the Internet Printing Protocol (IPP) to the printing apparatus 102. The response includes attribute information indicating functions that can be specified by the printing apparatus 102 (the capabilities of the printing apparatus 102) and the setting values related to the attribute information. The response is saved in the RAM 113.

With this configuration, according to the printing apparatus 102 connected to the print data generation software 202, the print data generation software 202 can configure print functions that can be used by the individual printing apparatus 102 so that the user can specify the print functions. That is, even if printing apparatuses having different functions or printing apparatuses developed by different vendors are connected to the print data generation software 202, the print data generation software 202 can configure print functions that can be used according to the connected printing apparatuses so that the user can specify the print functions.

A configuration is described in which an IPP Class Driver included in Windows (registered trademark) 11 is used as the print data generation software 202. The IPP Class Driver is a printer driver that executes a printing process according to the specifications of a standard printing protocol termed the IPP, and is included in the package of the OS. The IPP Class Driver is not a specific printer driver according to the model of the printing apparatus 102, and is a standard class driver that can be used in common by a plurality of printing apparatuses regardless of the vendors or the models. The IPP Class Driver acquires capability information regarding the printing apparatus 102 connected to the IPP Class Driver and generates the PDC 203 based on the acquired capability information so that the user can specify print functions to be supported by the connected printing apparatus 102. In the present exemplary embodiment, a printing form using the IPP Class Driver is occasionally also referred to as "Local Print". As the print data generation software 202, a Universal Print (UP) Class Driver included in Windows (registered trademark) 11 can also be used. The UP Class Driver is a printer driver used in Universal Print, which is a form of cloud printing for performing printing via a server.

The OS generates intermediate data (also referred to as "input data") based on the print instruction output from the drawing application 201 and passes the intermediate data to the print data generation software 202. Data output for printing from the drawing application 201 is data in a Graphics Device Interface (GDI) format (GDI format data) or data in an Extensible Markup Language (XML) Paper Specification (XPS) format (XPS format data). In a case where the IPP Class Driver is used as the print data generation software 202, and if the data output from the drawing application 201 is GDI format data, the OS converts the GDI format data output from the drawing application 201 into XPS format data. Then, the OS passes the converted XPS format data as the intermediate data to the print data generation software 202. If the data output from the drawing application 201 is XPS format data, the OS passes the XPS format data as the intermediate data to the print data generation software 202. The intermediate data includes drawing data as information regarding a picture (an image) to be formed on a paper surface, and the print setting information set by the user.

The print data generation software 202 converts the acquired intermediate data into print data that can be interpreted by the printing apparatus 102, and transmits the print data to the printing apparatus 102. The print data includes the drawing data as the information regarding the picture (the image) to be formed on the paper surface, and print setting attribute information (attribute information specifying print settings) generated based on the print setting information set by the user. The print setting attribute information includes attribute information indicating functions that can be specified by the printing apparatus 102 (the capabilities of the printing apparatus 102) and the setting values related to the attribute information.

The printing apparatus 102 performs printing on the paper surface based on the print data sent from the print data generation software 202. At this time, the printing apparatus 102 forms the drawing data included in the print data on the paper surface by an operation according to the print setting attribute information included in the print data. The print setting attribute information includes a print grade (image quality priority or speed priority) and attribute information for specifying two-sided printing, and the setting value of the attribute information. For example, in a case where the print setting attribute information includes attribute information specifying two-sided printing and a setting value indicating that two-sided printing is caused to operate, the printing apparatus 102 executes two-sided printing.

FIG. 2B is a diagram illustrating the configuration in a case where the extension application 204 is associated with the print data generation software 202 and the printing apparatus 102. Components and processes equivalent to those in FIG. 2A are not particularly mentioned below.

The extension application 204 is a software for extending the function of the print data generation software 202 and is a software that is not included in advance in (not preinstalled with) the OS. Thus, the user needs to download the extension application 204 from a server via the Internet and install the extension application 204 by operating the host computer 101. Alternatively, the extension application 204 may be automatically installed based on the connection of the printing apparatus 102 to the host computer 101. Specifically, if the printing apparatus 102 is connected to the host computer 101, the OS may acquire device identification information from the printing apparatus 102. The OS may download the extension application 204 corresponding to the acquired device identification information from the server via the Internet and install the extension application 204. That is, the print data generation software 202 and the extension application 204 are held as different files in the host computer 101.

The versions of the print data generation software 202 and the extension application 204 may be upgraded by updating the print data generation software 202 and the extension application 204. These update processes are also performed at different timings. That is, the timing when the host computer 101 acquires an update file for the print data generation software 202 and the timing when the host computer 101 acquires an update file for the extension application 204 are different from each other. A trigger for the host computer 101 to acquire the update file for the print data generation software 202 and a trigger for the host computer 101 to acquire the update file for the extension application 204 are also different from each other. If the extension application 204 is installed, the OS associates the extension application 204 with the print data generation software 202 and the printing apparatus 102.

The extension application 204 described in the present exemplary embodiment includes a print setting screen extension unit 205, a skip control unit 206, a print function extension unit 207, a print data editing unit 208, a notification unit 209, and a stand-alone start screen display unit 211. The extension application 204 also stores shared information 210 that can be accessed in common by the units. The actual content of the shared information 210 is a file saved in the external storage device 114 or information stored in the RAM 113. The extension application 204 writes or reads information to or from the shared information 210 using an application programming interface (API) provided by the OS.

Every time the processing of each unit ends, the operation of the extension application 204 may end. In this case, every time a request to use each unit is received, the OS starts the extension application 204. Another form is also possible. For example, if the processing of the print setting screen extension unit 205 ends, the OS may end the operation of the extension application 204. However, even if the processing of the skip control unit 206 ends, the OS may keep the extension application 204 operating. Further, the processing of the extension application 204 may be cancelled in the processing of each unit. If the processing of the extension application 204 is cancelled, the OS deletes a job that is being processed on a print queue.

If the drawing application 201 receives a print request from the user, the drawing application 201 issues a print instruction to the OS. Also in this configuration, similarly to the configuration in FIG. 2A, the drawing application 201 can display a print setting screen. In this configuration, a print setting screen provided by the extension application 204 is displayed. Specifically, a print setting screen provided by the print setting screen extension unit 205 included in the extension application 204 is displayed. Whether to display the print setting screen provided by the print setting screen extension unit 205 depends on an operation of the user. The details of the print setting screen extension unit 205 will be described below with reference to FIG. 4.

If the drawing application 201 receives the print request from the user and issues the print instruction to the OS, the OS starts the skip control unit 206. The skip control unit 206 controls whether to skip the processing of the print data generation software 202. After the skip control process of the skip control unit 206, the OS generates intermediate data based on the print instruction output from the drawing application 201 and passes the intermediate data to the print data generation software 202. If the skip control unit 206 does not perform the skip control, the intermediate data is processed by the print data generation software 202 into print data that can be interpreted by the printing apparatus 102, and the print data is passed to the print data editing unit 208. If, on the other hand, the print data generation software 202 is skipped, the intermediate data is passed to the print data editing unit 208 without being processed by the print data generation software 202. Consequently, the print data editing unit 208 can process the intermediate data.

The print data editing unit 208 edits the intermediate data passed from the print data generation software 202 or the print data processed by the print data generation software 202. As the content of the editing, to take layout printing as an example, the print data editing unit 208 changes the layout of the intermediate data or the print data based on print setting information regarding layout printing received from the OS. The print data editing unit 208 can also display a user interface (UI) screen on the display unit 119 and provide the function of displaying the result of laying out the intermediate data or the print data as a preview screen. In the state where the GUI screen displayed on the display unit 119 by the print data editing unit 208 remains open, the print data is not transmitted to the printing apparatus 102. If the GUI screen is closed, the process of transmitting the print data is performed.

After the print data editing unit 208 edits the print data, the print data is passed to the printing apparatus 102. The printing apparatus 102 performs printing on a paper surface based on the received print data.

If the skip control unit 206 skips the print data generation software 202, the print data editing unit 208 may convert the received intermediate data into print data that can be interpreted by the printing apparatus 102. To convert the intermediate data into print data, the print data editing unit 208 may use a function provided by the OS.

The extension application 204 includes the print function extension unit 207. The print function extension unit 207 can edit the PDC 203 generated by the print data generation software 202 or the OS. Consequently, the print function extension unit 207 can add a function provided by the extension application 204, add a function that is supported by the printing apparatus 102 but is not supported by the print data generation software 202, or add the exclusion relationship between the setting values of print functions. When the extension application 204 is initially associated with the printing apparatus 102 and the print data generation software 202, the OS starts the print function extension unit 207. Further, the OS may start the print function extension unit 207 at another timing such as when the OS starts. In this manner, in a case where a function related to printing is extended by adding an option apparatus (e.g., a finisher) to the printing apparatus 102 later, the print function extension unit 207 can detect the extension function and add the extension function to the PDC 203.

The extension application 204 also includes the notification unit 209. The notification unit 209 can display a notification to the user in response to the occurrence of an error in the printing apparatus 102. For example, if a sheet absence error occurs in the printing apparatus 102, the print data generation software 202 detects the sheet absence error, and the OS displays a message on the display unit 119 using a notification function termed a "toast notification" as a function of the OS. The user presses the toast notification, whereby the notification unit 209 of the extension application 204 is called by the OS, and a UI screen of the notification unit 209 is displayed. For example, the UI screen of the notification unit 209 can display a detailed message regarding the sheet absence error and a sheet filling method. Once the extension application 204 transmits print data to the printing apparatus 102, the extension application 204 cannot display a screen such as a guide associated with the print data in the middle of the processing of each unit.

The extension application 204 also includes the stand-alone start screen display unit 211. The extension application 204 operates cooperatively with the print data generation software 202, but the extension application 204 can also operate alone. The user instructs the extension application 204 to start, whereby the stand-alone start screen display unit 211 of the extension application 204 is called, and a UI screen of the stand-alone start screen display unit 211 is displayed.

The configuration of the extension application 204 for achieving the present exemplary embodiment is not limited to a configuration having all the above functions (units), and may be a configuration having some of the functions or a configuration having another function. The extension application 204 is occasionally also referred to simply as "print software". As described above, it can be said that the extension application 204 includes at least one of the function of cooperating with the print data generation software 202 to display a setting screen (the print setting screen extension unit 205), the function of controlling whether to skip the processing of the print data generation software 202 (the skip control unit 206), the function of editing print data to be input to the printing apparatus 102 (the print data editing unit 208), the function of extending a function that can be specified by the print data generation software 202 (the print function extension unit 207), and the function of displaying a screen in response to the occurrence of an error in the printing apparatus 102 (the notification unit 209), and the function of receiving a start instruction from the user and displaying a UI screen (the stand-alone start screen display unit 211).

Example of Screen Displayed by Stand-Alone Start Screen Display Unit

Figure 3:
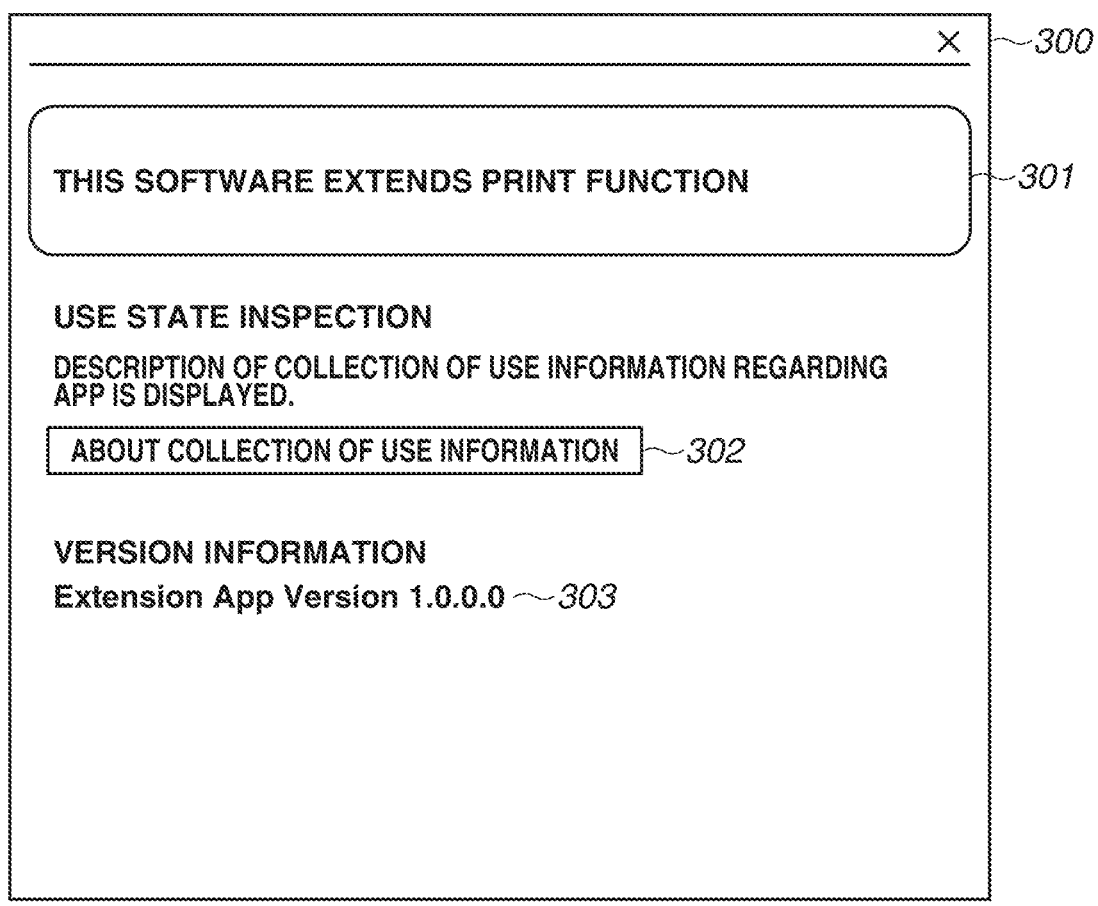
FIG. 3 is a diagram illustrating an example of a stand-alone start screen displayed by a stand-alone start screen display unit.

With reference to FIG. 3, the UI screen displayed by the stand-alone start screen display unit 211 is described. A stand-alone start screen 300 in FIG. 3 is an example of a UI screen displayed by the stand-alone start screen display unit 211 when the user instructs the extension application 204 to start. Since the extension application 204 is designed to extend the function of the print data generation software 202 in the present exemplary embodiment, the stand-alone start screen 300 has only minimum functions. A display area 301 is an area that displays the description of the role of the extension application 204. It is assumed that the extension application 204 is automatically installed for printing based on the connection of the printing apparatus 102 to the host computer 101.

Since a case is assumed where the user installs the extension application 204 without any intention, the display area 301 is provided so that the user can understand what the extension application 204 is for when the extension application 204 is started. A control 302 is a permission dialog start button. The control 302 is pressed, thereby displaying a dialog for confirming the permission of a use state inspection. The start screen displayed by starting the extension application 204 is common regardless of the type of a device (a laser beam device or an inkjet device).

Figure 4:
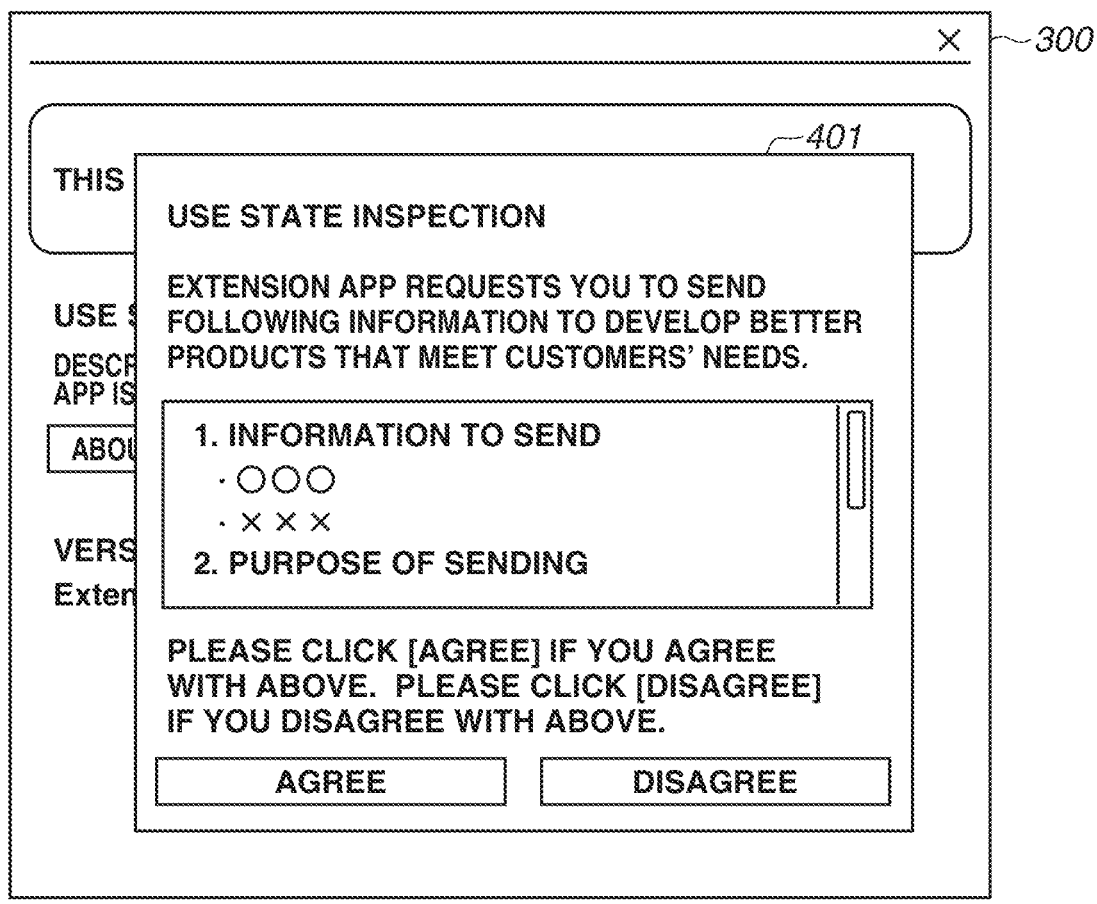
FIG. 4 is a diagram illustrating an example of a permission dialog displayed on the stand-alone start screen.

FIG. 4 is a diagram illustrating the state where the permission dialog for the use state inspection is displayed on the stand-alone start screen 300. The control 302 is pressed, whereby a permission dialog 401 starts.

The user confirms a message displayed in the permission dialog 401 and then chooses whether to agree with the message. If the user chooses to agree with the message, the extension application 204 sends an operation performed by the user and environment information regarding the host computer 101 on which the extension application 204 is installed to a server, and collects this information. The app vendor uses the collected information to improve the extension application 204. If the user does not choose to agree with the message in the permission dialog 401, the extension application 204 does not collect information as described above. The permission dialog 401 may be displayed when the stand-alone start screen 300 is started for the first time, in addition to when the control 302 is pressed. The permission dialog 401 is displayed when the stand-alone start screen 300 is initially started, whereby the extension application 204 can more certainly confirm whether the user agrees with the message. A display area 303 is an area that displays version information regarding the extension application 204.

Examples of Screen Displayed by Print Setting Screen Extension Unit

Figure 5B:
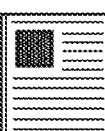

Next, with reference to FIGS. 5A and 5B, the print setting screen displayed by the print setting screen extension unit 205 is described. A print setting screen 500 in FIGS. 5A and 5B is examples of a screen displayed by the print setting screen extension unit 205 based on generated PC. If the user instructs the print setting screen to be displayed on the drawing application 201, the print setting screen extension unit 205 is called by the OS. Based on PC that can be acquired from the OS, the print setting screen extension unit 205 displays a screen where the user can specify the setting values of print functions that can be specified by the print data generation software 202.

The print setting screen 500 in FIG. 5A is an example of a screen displayed by the print setting screen extension unit 205 in a case where an inkjet device is associated as the printing apparatus 102. A control 501 is a start button for the stand-alone start screen 300. The control 501 is pressed, whereby the stand-alone start screen display unit 211 displays the stand-alone start screen 300. If the stand-alone start screen 300 is displayed for the first time, the stand-alone start screen display unit 211 also displays the confirmation dialog 401 for the permission of the use state inspection. If the extension application 204 is automatically installed using the connection of the printing apparatus 102 as a trigger, it is possible that the user is not aware that the extension application 204 is installed, and does not start the stand-alone start screen 300. Accordingly, the control 501 for starting the stand-alone start screen 300 is placed on the print setting screen 500, thereby contributing to an increase in the permission rate of the use state inspection.

A control 502 is a control item in which the type of sheet for use in printing can be set. For example, an item such as plain paper or a photograph sheet can be set. A control 503 is a control item in which the sheet size for use in printing can be set. For example, an item such as A4 or letter can be set. A control 504 is a control item in which the orientation of printing can be set. Portrait or landscape can be set. A control 505 is a control item in which a sheet feeding port for a print sheet in the printing apparatus 102 can be set. For example, an item such as a main tray or a rear tray can be set. A control 506 is a control item in which the enabling and the disabling of reverse order printing can be switched. A control 507 is a control item in which the enabling and the disabling of marginless printing can be switched. A control 508 is a control item in which two-sided printing can be set. For example, one-sided printing, two-sided printing and long side binding, or two-sided printing and short side binding can be set. A control 509 is an OK button. The control 509 is pressed, thereby closing the screen by reflecting the settings. A control 510 is a cancellation button. The control 510 is pressed, thereby closing the screen without reflecting the settings.

The print setting screen 500 in FIG. 5B is an example of a screen displayed by the print setting screen extension unit 205 in a case where a laser beam device is associated as the printing apparatus 102. Controls 501 to 510 are the same as those in FIG. 5A, and therefore are not described.

A control 511 is a control item in which the enabling and the disabling of marginless printing can be switched, and is a control used to make the same setting as the control 507, but the function name of the control 511 is described as "print by expanding printing area". Even if the same setting is used, the manner of presenting the function of the setting to the user may differ between the inkjet device and the laser beam device.

Thus, the function names of the controls 507 and 511 are switched according to the device type. A control 512 is a control item in which the stapling position can be set. A control 513 is a control item in which punching can be set. The controls 512 and 513 are not included in the print setting screen 500 in FIG. 5A.

In FIGS. 5A and 5B, the screens have different configurations. That is, the print settings to be displayed, the function names to be displayed, and the placement order of the controls for changing the print settings are different. The type of sheet, the sheet size, the orientation of printing, the sheet tray, and two-sided printing can be set regardless of the device type. Reverse order printing can be set only when the inkjet device is used. Stapling and punching can be set only when the laser beam device is used.

What print setting controls are to be placed on the print setting screen 500 is determined based on PC acquired from the print data generation software 202 and compatible function information regarding each device type determined by a method described below. Consequently, the same UI screen is not displayed on all printing apparatuses 102 connected to the print data generation software 202, and a UI screen appropriately customized according to the device type can be displayed. In FIG. 5A, the control 502 for setting the type of sheet is placed at the top, whereas in FIG. 5B, the control 503 for setting the sheet size is placed at the top. Functions regarded as important differ between the inkjet device and the laser beam device. Since the inkjet device appropriately uses a variety of types of sheets according to the purpose, the setting of the type of sheet is regarded as important. Thus, the control 502 for setting the type of sheet is placed at the top, which attracts the user's attention. On the other hand, since the laser beam device uses plain paper mainly for an office purpose, the setting of the type of sheet is hardly changed. Thus, the control 502 for setting the type of sheet is placed at a position lower than those of the settings of the sheet size and the orientation of printing. Thus, for the inkjet device, as illustrated in FIG. 5A, the type of sheet, the sheet size, and the orientation of printing are placed in order from the top. On the other hand, for the laser beam device, as illustrated in FIG. 5B, the sheet size, the orientation of printing, and the type of sheet are placed in order from the top. As described above, in the present exemplary embodiment, the placement order of the same print settings differs depending on the type of the device.

In the process of determining the device type, there is a case where the device type is determined as other devices, which are neither the inkjet device nor the laser beam device. In this case, it is possible that only minimum functions common to both the inkjet device and the laser beam device are displayed. Alternatively, a configuration may be employed in which, if the device type is determined as other devices, the same functions as those of either the inkjet device or the laser beam device are displayed.

<Display Process for Displaying Print Setting Screen>

FIG. 6 is a diagram illustrating a main processing flow in a print setting screen display process performed by the print setting screen extension unit 205 in this printing system. In the following description, the print setting screen extension unit 205 may perform each process, but actually, a corresponding function is achieved by the CPU 111 executing a corresponding program.

The flow is FIG. 6 starts by the extension application 204 receiving an instruction to display a print setting screen from the drawing application 201. In step S601, the print setting screen extension unit 205 acquires PC from the print data generation software 202. FIG. 8 is a diagram illustrating an example of PC 800 generated by the print data generation software 202. The PC 800 includes information regarding a function (Feature) that can be used by the print data generation software 202 and information regarding a setting value (Option) of a certain function. It is indicated that in the PC 800 in FIG. 8, the sheet size (PageMediaSize), the type of sheet (PageMediaType), and the orientation of printing (PageOrientation) can be set. The print setting screen extension unit 205 or an application that provides a unique print setting screen can provide a print setting screen by referencing the PC 800.

In step S602, the print setting screen extension unit 205 acquires device information from the printing apparatus 102. The device information is included in a response acquired by issuing a Get-Printer-Attributes operation in the IPP to the printing apparatus 102. In step S603, the print setting screen extension unit 205 determines the device type of the associated printing apparatus 102, using the information acquired in step S602.

FIG. 7 is a flowchart illustrating the detailed flow of the process of step S603 performed by the print setting screen extension unit 205. The flow in FIG. 7 is based on the premise that the information acquired in step S602 is information obtained from the response to the Get-Printer-Attributes operation in the IPP made by the printing apparatus 102, but may be a flow in which the device type is determined using information obtained by another method. In step S701, the print setting screen extension unit 205 confirms whether a "marker-types" attribute is included in the response to the Get-Printer-Attributes operation in the IPP made by the printing apparatus 102. If the determination is Yes in step S701 (Yes in step S701), then in step S702, the print setting screen extension unit 205 confirms whether the value of the "marker-types" attribute in the response to the Get-Printer-Attributes operation in the IPP made by the printing apparatus 102 is "ink-cartridge". If the determination is Yes in step S702 (Yes in step S702), then in step S703, the print setting screen extension unit 205 determines the device type of the printing apparatus 102 as the inkjet device.

If the determination is No in step S701 (No in step S701), then in step S705, the print setting screen extension unit 205 confirms whether a "printer-supply" attribute is included in the response to the Get-Printer-Attributes operation in the IPP made by the printing apparatus 102. If the determination is Yes in step S705 (Yes in step S705), then in step S706, the print setting screen extension unit 205 confirms whether "type=toner" is included in the value of the "printer-supply" attribute in the response to the Get-Printer-Attributes operation in the IPP made by the printing apparatus 102. If the determination is Yes in step S706 (Yes in step S706), then in step S707, the print setting screen extension unit 205 determines the device type of the printing apparatus 102 as the laser beam device. If the determination is No in step S702, S705, or S706 (No in step S702, S705, or S706), then in step S704, the print setting screen extension unit 205 determines the device type of the printing apparatus 102 as other devices.

In FIG. 7, the print setting screen extension unit 205 determines the device type based on the information obtained from the response to the Get-Printer-Attributes operation in the IPP made by the printing apparatus 102, but may make the determination based on other information. For example, the printing apparatus 102 may make the determination based on information acquired by another method. Alternatively, the printing apparatus 102 may make the determination based on information regarding the name of the printing apparatus 102 acquired from the printing apparatus 102 and table information held in the extension application 204. The table information may be configured to be acquired from a server (not illustrated).

The description returns to the flow in FIG. 6. In step S604, the print setting screen extension unit 205 acquires compatible function information 1401 according to the device type. FIG. 14 is a diagram illustrating an example of the compatible function information 1401 acquired in step S604. The compatible function information 1401 describes functions as targets to be displayed on the print setting screen by the print setting screen extension unit 205 and information regarding the display order of the functions with respect to each device type. It is possible that the compatible function information 1401 is held in advance in the extension application 204. Alternatively, the compatible function information 1401 stored in an external server may be acquired.

The processes of steps S605 and S606 are processes that the print setting screen extension unit 205 repeatedly performs regarding each of the functions described in the compatible function information 1401 acquired in step S604. For example, if it is determined in step S603 that the device type is the inkjet device, the print setting screen extension unit 205 repeatedly executes the processes of steps S605 and S606 regarding the type of sheet, the sheet size, the orientation of printing, the sheet tray, reverse order printing, marginless printing, and two-sided printing. In step S605, the print setting screen extension unit 205 confirms whether a compatible function is present in the PC. The PC is generated based on PDC generated by the IPP Class Driver acquiring capability information from the printing apparatus 102. That is, functions described in the PC are functions that can be set by the IPP Class Driver. The print setting screen extension unit 205 confirms a function as a display target in the compatible function information 1401 and confirms whether the printing apparatus 102 connected to the host computer 101 based on the PC is compatible with the function.

If the determination is Yes in step S605 (Yes in step S605), then in step S606, the print setting screen extension unit 205 adds a control for setting the function to the print setting screen 500. If the determination is No in step S605 (No in step S605), the print setting screen extension unit 205 determines that the printing apparatus 102 is not compatible with the function, and does not add the control for setting the function to the print setting screen 500. By repeating steps S605 and S606 as many times as the functions as the targets, the print setting screen extension unit 205 displays the print setting screen 500 according to the capability and the device type of the connected device.

A function that is not present in the compatible function information 1401 is a function that does not need to be set by the user or a function that is not grasped at the time when the extension application 204 is developed. The function that does not need to be set by the user is not displayed on the print setting screen 500, whereby the setting screen can be simplified. This makes it easy for the user to pay attention to important print settings. Thus, even if information indicating the function is present in the PC, the information is not displayed on the print setting screen 500. The influence of the setting of the function that is not grasped at the time when the extension application 204 is developed is unknown, and therefore, even if information indicating the function is present in the PC, the information is not displayed on the print setting screen 500 so that the user does not set the function.

Examples of Screen Displayed by Notification Unit

Figure 9A:
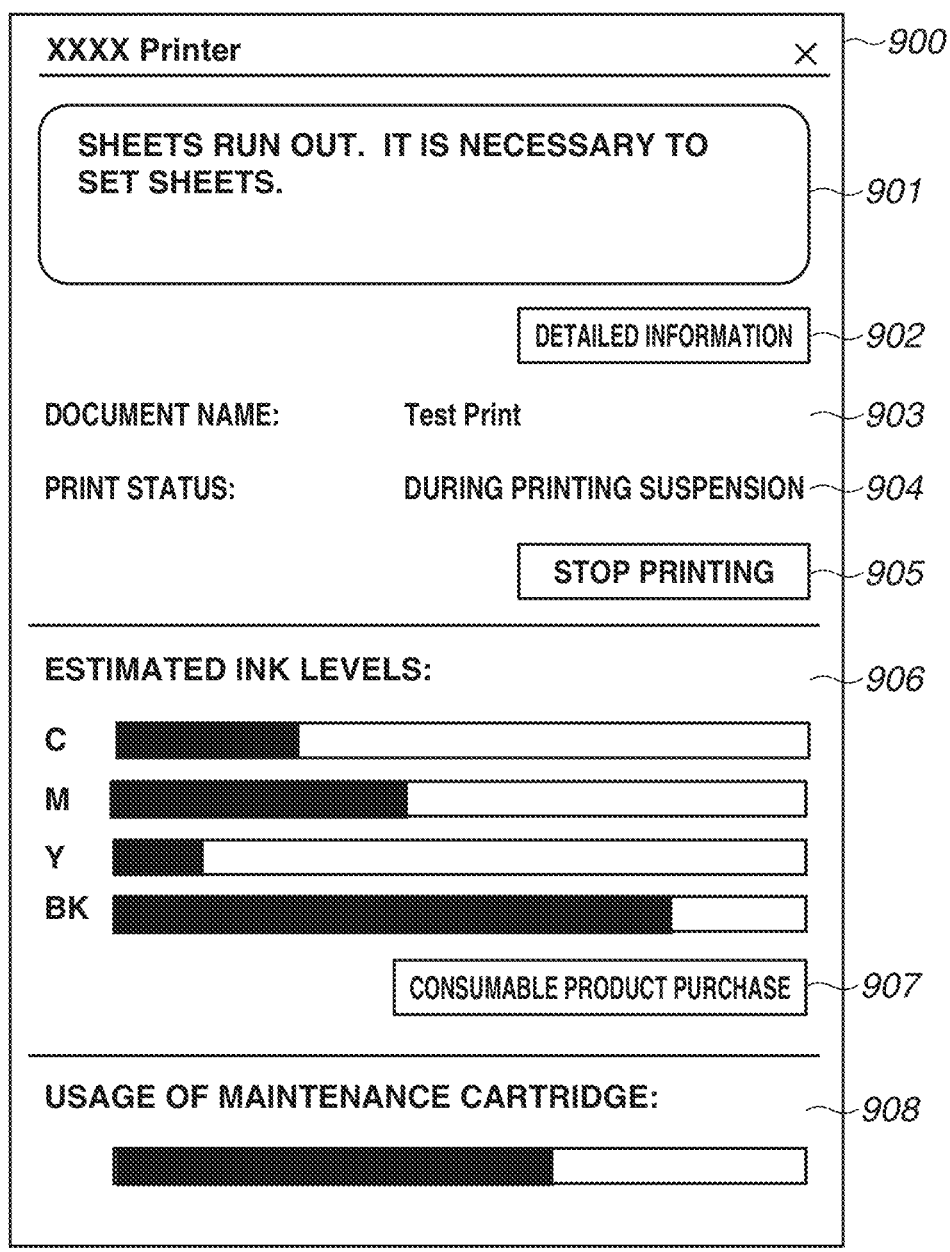
FIGS. 9A and 9B are diagrams illustrating examples of a status notification screen displayed by a notification unit.
Figure 9B:
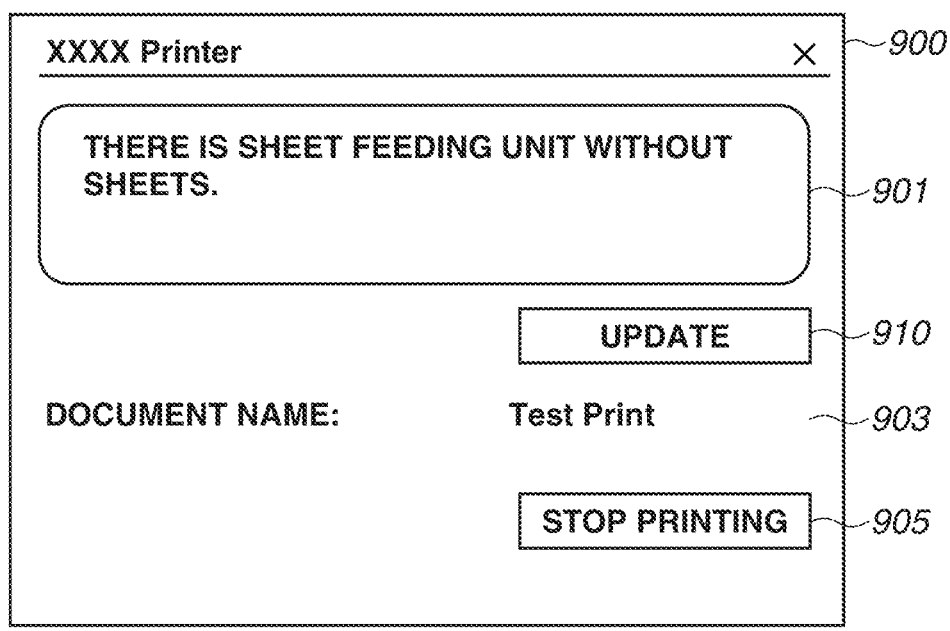

Next, with reference to FIGS. 9A and 9B, the UI screen displayed by the notification unit 209 is described. A status notification screen 900 in FIGS. 9A and 9B is examples of a screen displayed by the notification unit 209 based on information acquired from the printing apparatus 102. If the user presses a toast notification displayed by the OS using as a trigger the fact that the printing apparatus 102 enters an error state, the notification unit 209 is called by the OS.

The status notification screen 900 in FIG. 9A is an example of a screen displayed by the notification unit 209 in a case where the inkjet device is associated as the printing apparatus 102. A display area 901 is a display area that displays a message corresponding to device information acquired from the printing apparatus 102. In FIGS. 9A and 9B, the display area 901 displays a message in a case where the printing apparatus 102 is in a sheet shortage error state. A control 902 is a Remote UI start button. The control 902 is pressed, thereby displaying a Remote UI as an interface provided by the printing apparatus 102 associated with the extension application 204. It is possible that the Remote UI is displayed by starting a browser. Alternatively, the Remote UI may be displayed in the status notification screen 900. With this configuration, the user can view and manage device information and consumable product information regarding the printing apparatus 102 through the Remote UI.

Display areas 903 and 904 display information regarding this print job. If an error occurs in the printing apparatus 102 in the processing of a print job that is being processed by the print data generation software 202, the OS displays a toast notification. A toast notification that triggers the start of the status notification screen 900 is associated with a particular print job. The notification unit 209 gives an instruction to display information regarding the print job associated with the toast based on which the status notification screen 900 is started, or stop printing.

The display area 903 displays the document name of the print job. The display area 904 displays the state of the print job. Examples of the state of the print job displayed in the display area 904 include state information such as "during printing suspension" displayed in a case where the printing apparatus 102 is in an error state and "during printing" displayed in a case where an error is removed and printing is resumed. A control 905 is a cancellation button for the print job. The control 905 is pressed, thereby cancelling the print job and stopping printing. A display area 906 is a display area that displays the remaining amounts of ink. The notification unit 209 acquires device information from the printing apparatus 102, and based on ink remaining amount information included in the device information, displays the remaining amounts of ink in a bar format. A control 907 is a consumable product purchase button. The control 907 is pressed, thereby displaying a website for purchasing a consumable product such as ink. It is possible that the consumable product purchase website is displayed by starting the browser. Alternatively, the consumable product purchase website may be displayed in the status notification screen 900. A display area 908 is an area that displays the usage of a maintenance cartridge. The notification unit 209 acquires device information from the printing apparatus 102, and based on maintenance cartridge capacity information included in the device information, displays the usage of the maintenance cartridge.

The status notification screen 900 in FIG. 9B is an example of a screen displayed by the notification unit 209 in a case where the laser beam device is associated as the printing apparatus 102. A description is given on the assumption that in FIG. 9B, the UP Class Driver is used as the print data generation software 202. Controls 901, 903, and 905 are the same as those in FIG. 9A, and therefore are not described. A control 910 is an update button. The control 910 is pressed, thereby reacquiring device information or job information from the printing apparatus 102 and updating the display according to the acquired information.

In a case where the update button is not displayed, the notification unit 209 reacquires the information and updates the display at regular intervals. The update button is used to manually update the display in cloud printing in which the amount of communication due to polling should be reduced because the amount of communication is directly linked to the cost.

As described above, the notification unit 209 not only informs the user of the status based on device information acquired from the printing apparatus 102, but also changes the screen configuration according to the device type or the print data generation software 202 that is being used, and thereby can provide a status notification adapted to the printing apparatus 102 connected to the extension application 204 to the user.

<Display Process of Notification Unit>

Figure 10:
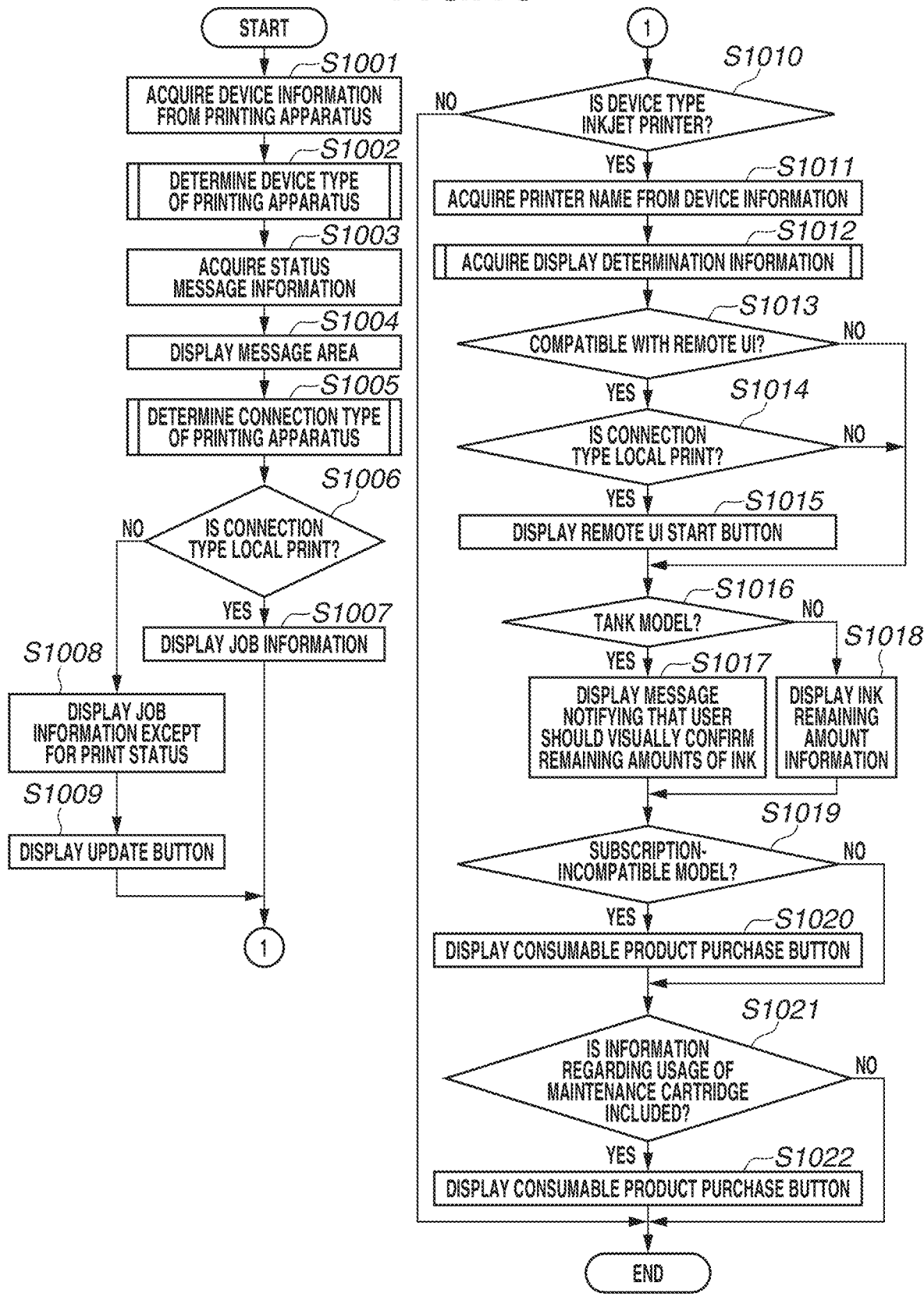
FIG. 10 is a diagram illustrating a processing flow of display of a status notification screen performed by the notification unit.

FIG. 10 is a diagram illustrating a main processing flow in a status notification screen display process performed by the notification unit 209 in this printing system. In the following description, the notification unit 209 may perform each process, but actually, a corresponding function is achieved by the CPU 111 executing a corresponding program.

The flow in FIG. 10 starts by the extension application 204 receiving an instruction to display a status notification screen from the OS through a toast notification. In step S1001, the notification unit 209 acquires device information from the printing apparatus 102. The device information is included in a response acquired by issuing a Get-Printer-Attributes operation in the IPP to the printing apparatus 102. In step S1002, the notification unit 209 determines the device type of the printing apparatus 102 associated with the extension application 204, using the information acquired in step S1001.

The process of step S1002 is similar to FIG. 7 and therefore is not described, but is performed by the notification unit 209. It is also possible that if the print setting screen extension unit 205 makes the determinations in advance, information regarding the determinations is stored in the shared information 210 and acquired, thereby skipping the processing in FIG. 7. In step S1003, the notification unit 209 acquires status message information. It is possible that the status message information is held in advance in the extension application 204. Alternatively, the status message information stored in an external server may be acquired. FIG. 15 is a diagram illustrating an example of the status message information. Status message information 1501 describes information regarding messages to be displayed in each of a case where the printing apparatus 102 associated with the status is the inkjet device and a case where the printing apparatus 102 associated with the status is the laser beam device. For example, if the status information acquired from the printing apparatus 102 indicates "during printing", the notification unit 209 displays the same message regardless of the device type.

If, on the other hand, the status information acquired from the printing apparatus 102 indicates "sheet absence error", the notification unit 209 displays a message different depending on the device type. For example, in the case of the inkjet device, the notification unit 209 displays "Sheets run out. It is necessary to set sheets." On the other hand, in the case of the laser beam device, since many products include a plurality of sheet feeding units, the notification unit 209 displays "There is sheet feeding unit without sheets." If the status message information 1501 indicates "ink empty", only the inkjet device displays a message corresponding to this status. If the status message information 1501 indicates "toner empty", only the laser beam device displays a message corresponding to this status. Alternatively, the notification unit 209 may display not only messages such as "ink empty" (ink shortage) and "toner empty" (toner shortage) but also messages such as "ink low" and "toner low" in the status where the remaining amounts of ink are small and the status where the remaining amounts of toner are small, respectively. As described above, a message displayed by the notification unit 209 may differ depending on the device type of the device connected as the printing apparatus 102. In step S1004, based on the device type determined in step S1002 and the status message information 1501 acquired in step S1003, the notification unit 209 displays an appropriate message. In the present exemplary embodiment, the notification unit 209 switches the message according to the device type. Alternatively, the notification unit 209 may switch the message according to other information. For example, the notification unit 209 may determine the connection type of the printing apparatus 102 and switch the message according to whether the connection type is Local Print or Universal Print.

Figure 11:
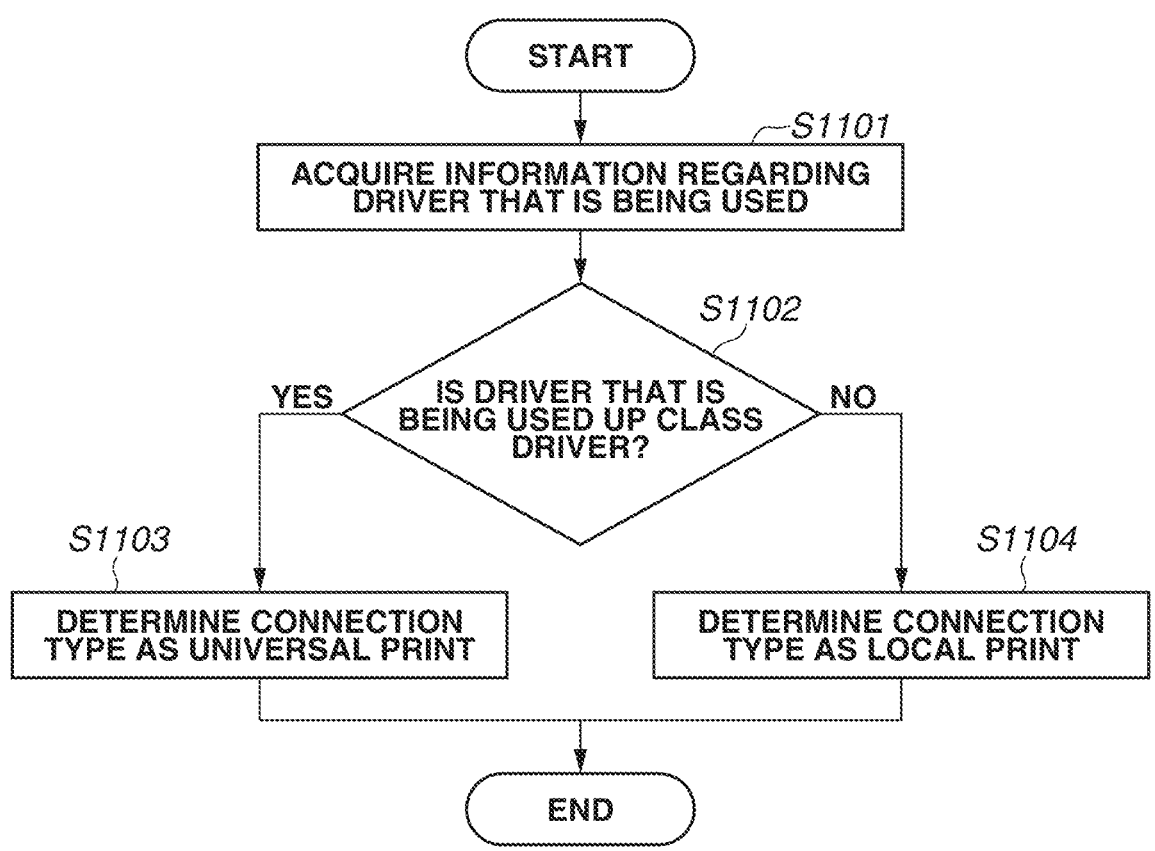
FIG. 11 is a diagram illustrating a flow of a determination of a connection type of the printing apparatus.

In step S1005, the notification unit 209 determines the connection type of the printing apparatus 102 associated with the extension application 204. FIG. 11 is a flowchart illustrating the detailed flow of the process of step S1005 performed by the notification unit 209. In step S1101, the notification unit 209 acquires information regarding the print data generation software 202 that is being used by the printing apparatus 102 associated with the extension application 204. The print data generation software 202 that can be extended by the extension application 204 includes two types, namely the IPP Class Driver and the UP Class Driver. That is, the printing apparatus 102 associated with the extension application 204 is using either the IPP Class Driver or the UP Class Driver. Accordingly, in step S1102, the notification unit 209 confirms whether the driver that is being used is the UP Class Driver. If the determination is Yes in step S1102 (Yes in step S1102), then in step S1103, the notification unit 209 determines the connection type of the printing apparatus 102 as Universal Print. If the determination is No in step S1102 (No in step S1102), then in step S1104, the notification unit 209 determines the connection type of the printing apparatus 102 as Local Print.

The description returns to the flow in FIG. 10. In step S1006, the notification unit 209 confirms whether the connection type is Local Print. If the determination is Yes in step S1006 (Yes in step S1006), then in step S1007, the notification unit 209 displays the display areas 903 and 904 indicating print job information and the cancellation button 905 for cancelling the print job on the status notification screen 900.

Steps S1008 and S1009 are processes executed if it is determined that the connection type is Universal Print. If the determination is No in step S1006 (No in step S1006), then in step S1008, the notification unit 209 displays the display area 903 indicating the print job information and the control 905 for giving an instruction to cancel the print job on the status notification screen 900, and does not display the display area 904 indicating status information regarding the print job. The display area 904 is not displayed in Universal Print because it is possible that if the state information is acquired via a server, the state information cannot be accurately synchronized with the state of the printing apparatus 102. Next, in step S1009, the notification unit 209 displays the control 910 for giving an instruction to update the display on the status notification screen 900.

In the present exemplary embodiment, the Remote UI start button, the remaining amounts of ink, the ink purchase button, and the usage of the maintenance cartridge are displayed only in a case where the inkjet device is used. Accordingly, in step S1010, the notification unit 209 confirms whether the type determined in step S1002 is the inkjet printer. If the determination is Yes in step S1010 (Yes in step S1010), the processes of steps S1011 to S1022 are executed, thereby displaying the Remote UI start button, the remaining amounts of ink, the ink purchase button, and the usage of the maintenance cartridge.

First, in step S1011, the notification unit 209 acquires information regarding the printer name from the device information acquired in step S1001. Next, in step S1012, the notification unit 209 acquires display determination information. FIG. 13 is a diagram illustrating an example of display determination information 1301. The display determination information 1301 illustrated in FIG. 13 describes information regarding whether the printer type is compatible with the Remote UI, information regarding whether the printer type is a tank model, and information regarding whether the printer type is a subscription-incompatible model in association with printer information. Based on the display determination information 1301 and the printer name of the printing apparatus 102 connected to the extension application 204, the notification unit 209 determines the content to be displayed on the status notification screen 900.

Figure 12:
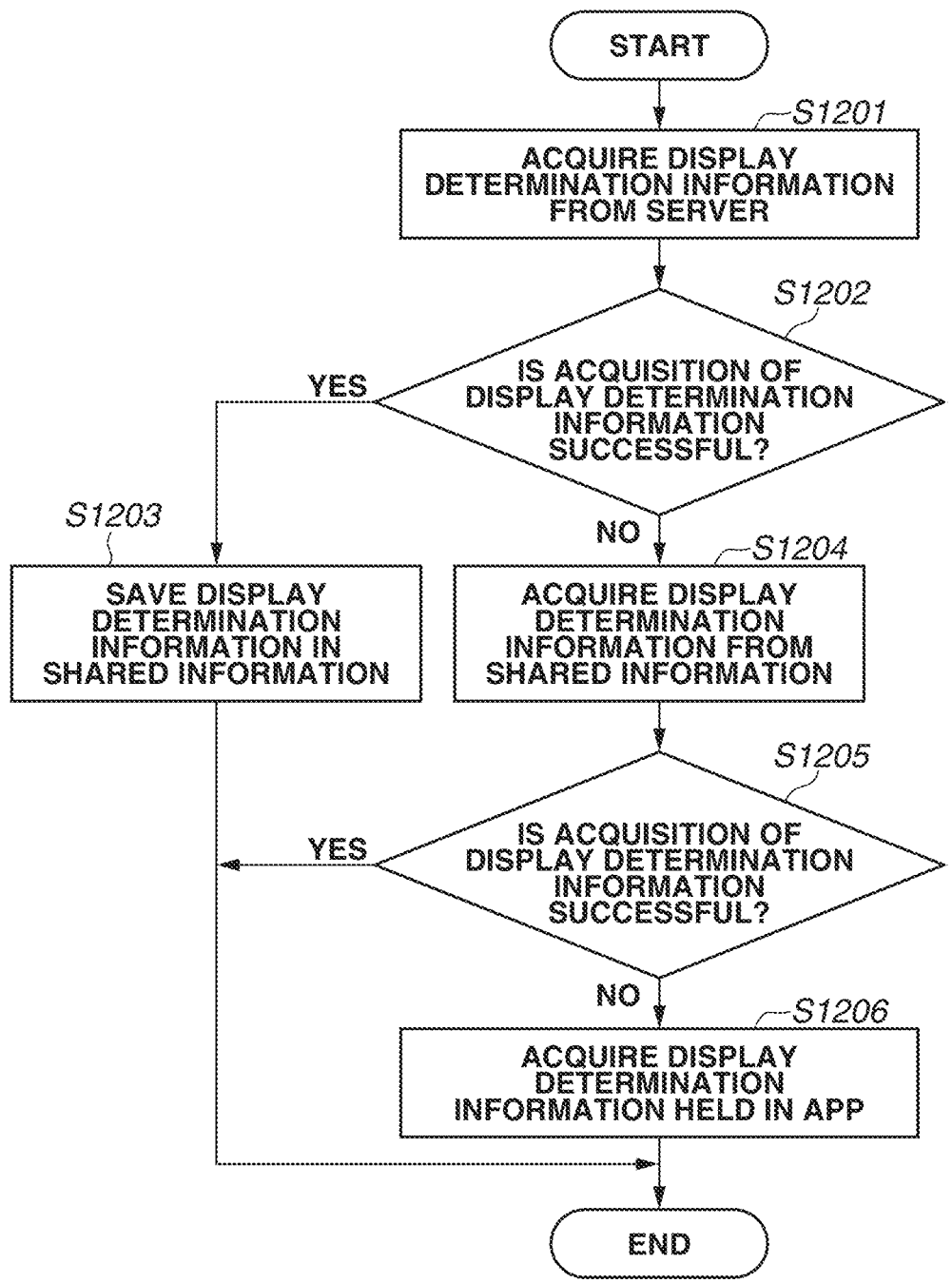
FIG. 12 is a diagram illustrating a flow of acquisition of display determination information.

FIG. 12 is a flowchart illustrating the detailed flow of the process of step S1012 performed by the notification unit 209. In step S1201, the notification unit 209 acquires the display determination information 1301 from a server. The configuration in which the display determination information 1301 is acquired from the server is employed, whereby the notification unit 209 can acquire the latest information without releasing the update of the extension application 204. In step S1202, the notification unit 209 confirms whether the acquisition of the display determination information 1301 in step S1201 is successful.

If the determination is Yes in step S1202 (Yes in step S1202), the notification unit 209 uses the display determination information 1301 acquired in step S1201 in the processes of step S1013 and subsequent steps in FIG. 10. In step S1203, the notification unit 209 saves the display determination information 1301 in the shared information 210. Consequently, even if the display determination information 1301 cannot be acquired from the server when the extension application 204 starts from the next time onward, the notification unit 209 can use the latest information that can be acquired. If the determination is No in step S1202 (No in step S1202), then in step S1204, the notification unit 209 acquires the display determination information 1301 from the shared information 210. In step S1205, the notification unit 209 confirms whether the acquisition of the display determination information 1301 in step S1204 is successful. If the determination is Yes in step S1205 (Yes in step S1205), the notification unit 209 uses the display determination information 1301 acquired in step S1204 in the processes of step S1013 and the subsequent steps in FIG. 10. If the determination is No in step S1205 (No in step S1205), then in step S1206, the notification unit 209 acquires the display determination information 1301 held in advance in the extension application 204 and uses the display determination information 1301 in the processes of step S1013 and the subsequent steps in FIG. 10.

The description returns to the flow in FIG. 10. Steps S1013 to S1015 are processes for displaying the control 902, which is the Remote UI start button, on the status notification screen 900.

In step S1013, based on the printer name and the display determination information 1301, the notification unit 209 confirms whether the printer connected to the extension application 204 is compatible with the Remote UI function. If the determination is Yes in step S1013 (Yes in step S1013), then in step S1014, based on the information determined in step S1005, the notification unit 209 confirms whether the connection type is Local Print. In the case of Universal Print, the printing apparatus 102 is connected to the extension application 204 via a server, and therefore cannot display the Remote UI. If the determination is Yes in step S1014 (Yes in step S1014), then in step S1015, the notification unit 209 displays the control 902, which is the Remote UI start button, on the status notification screen 900. If the determination is No in step S1013 or S1014 (No in step S1013 or S1014), the notification unit 209 does not display the control 902, which is the Remote UI start button, on the status notification screen 900.

Steps S1016 to S1018 are processes for switching the display content of the display of the remaining amounts of ink. In step S1016, based on the printer name and the display determination information 1301, the notification unit 209 confirms whether the printer connected to the extension application 204 is the tank model. The tank model is used by the user injecting ink into a tank included in the printing apparatus 102, and therefore, a difference may occur between the actual remaining amounts of ink and the ink remaining amount information grasped by the printing apparatus 102. Thus, in the tank model, the remaining amounts based on the ink remaining amount information acquired from the printing apparatus 102 are not displayed, and a message notifying the user that the user should visually confirm the remaining amounts of ink is displayed instead. If the determination is Yes in step S1016 (Yes in step S1016), then in step S1017, the notification unit 209 displays a message notifying the user that the user should visually confirm the remaining amounts of ink in the display area 906 that displays the remaining amounts of ink. If the determination is No in step S1016 (No in step S1016), then in step S1018, based on the device information acquired in step S1001, the notification unit 209 displays the ink remaining amount information in the display area 906. As described above, in the case of not the tank model but a cartridge type in which an ink cartridge is attached to a carriage of the printing apparatus 102, the remaining amounts of ink are displayed. The printing apparatus 102 of the carriage type may be a device including a recording head of a disposal type in which an ink tank and a recording head are integrated together, or may be a printing apparatus including a recording head of a permanent type in which an ink tank and a recording head are separate from each other.

Steps S1019 and S1020 are processes for displaying the consumable product purchase button 907 on the status notification screen 900. In step S1019, based on the printer name and the display determination information 1301, the notification unit 209 confirms whether the printing apparatus 102 connected to the extension application 204 is the subscription-incompatible model. In a subscription-compatible device, ink is supplied from the printer vendor according to the contract, and therefore, the users do not need to purchase ink themselves. Thus, the consumable product purchase button 907 is unnecessary. If the determination is Yes in step S1019 (Yes in step S1019), then in step S1020, the notification unit 209 displays the control 907, which is the consumable product purchase button, on the status notification screen 900. If the determination is No in step S1019 (No in step S1019), then in step S1020, the notification unit 209 does not display the control 907, which is the consumable product purchase button, on the status notification screen 900. Even if it is determined in step S1019 that the printing apparatus 102 is the subscription-compatible model, the notification unit 209 may further determine whether a predetermined contract for a subscription is signed. If the predetermined contract is not signed, the notification unit 209 may display the control 907, which is the consumable product purchase button.

Steps S1021 and S1022 are processes for displaying the display area 908, which displays the usage of the maintenance cartridge, on the status notification screen 900. In step S1021, the notification unit 209 confirms whether information regarding the usage of the maintenance cartridge is included in the device information acquired in step S1001. If the printing apparatus 102 is not compatible with the replacement of the maintenance cartridge, the information regarding the usage of the maintenance cartridge is not included in the device information. Thus, the notification unit 209 does not display the usage of the maintenance cartridge. If the determination is Yes in step S1021 (Yes in step S1021), then in step S1022, the notification unit 209 displays the display area 908, which displays the usage of the maintenance cartridge. If the determination is No in step S1021 (No in step S1021), the notification unit 209 does not display the display area 908.

If the determination is No in step S1010 (No in step S1010), the processes of steps S1011 to S1022 are skipped, and the notification unit 209 does not display the Remote UI start button, the remaining amounts of ink, and the ink purchase button. By the above processing, it is possible to configure the appropriate status notification screen 900 according to the type or the connection form of the printing apparatus 102 connected to the extension application 204 and the capabilities of an individual printer.

Generally, the laser beam device is used in a shared state, and an error is referenced on the main body side. Thus, the status notification screen 900 displays only minimum information that enables the user to notice an error state. In contrast, there is also a case where the inkjet device does not include a display panel in the main body. Thus, there is a limitation on information of which the printing apparatus main body can notify the user, and therefore, it is important for the host computer 101 to display information.

As described above, according to the present exemplary embodiment, a single extension application 204 can display an appropriate UI screen according to the printing apparatus 102 connected to the extension application 204. More specifically, in the extension application 204 according the present exemplary embodiment, a print setting screen or a status notification screen is varied according to the type of the printing apparatus 102. Consequently, in the present exemplary embodiment, it is possible to display an appropriate UI screen according to the type of the printing apparatus 102.

In the present exemplary embodiment, if the type of the printing apparatus 102 is an inkjet device, a display method regarding the remaining amounts of ink is varied according to whether the printing apparatus 102 is a tank type (a first type) or a carriage type (a second type). Specifically, if the printing apparatus 102 is the tank type, the remaining amounts of ink are not displayed. If the printing apparatus 102 is not the tank type, i.e., the printing apparatus 102 is the carriage type, the remaining amounts of ink are displayed. In the present exemplary embodiment, however, if the printing apparatus 102 is the tank type, the remaining amounts of ink are not displayed, but a message is displayed instead. Further, in the present exemplary embodiment, if the printing apparatus 102 is not a model compatible with a subscription as a predetermined service, an item for connecting to a consumable product purchase website (a consumable product purchase button) is displayed. As described above, in the present exemplary embodiment, if the printing apparatus 102 is an inkjet device (a printing apparatus in an inkjet format), it is possible to display an appropriate UI screen according to the type of the printing apparatus in the inkjet format.

In the present exemplary embodiment, the display of a UI screen is varied according to whether Universal Print or Local Print is used. That is, whether to display or hide an item for starting a Remote UI (a Remote UI start button) is switched according to whether a printing form using an IPP Class Driver (a first printing form) or a printing form using a UP Class Driver (a second printing form) is used. Consequently, in the present exemplary embodiment, it is possible to display an appropriate UI screen according to the printing form.

Although the above description has been given on the assumption that a first model is an inkjet device, and a second model is a laser beam device, the present exemplary embodiment is not limited to this combination. For example, the second model is not limited to the laser beam device, and can be widely applied to an electrophotographic device such as a light-emitting diode (LED) printer device.

The purpose of the present disclosure is achieved by supplying a storage medium recording a program code of software for achieving the functions of the above exemplary embodiments to a system or an apparatus, and by a computer (or a CPU or a microprocessor unit (MPU)) of the system or the apparatus reading and executing the program code stored in the storage medium. In this case, the program code itself read from the storage medium achieves the functions of the above exemplary embodiments, and the storage medium storing the program code constitutes the present disclosure.

As the storage medium for supplying the program code, a flexible disk, a hard disk, an optical disc, a magneto-optical disc, a Compact Disc Read-Only Memory (CD-ROM), a Compact Disc-Recordable (CD-R), a magnetic tape, a nonvolatile memory card, a ROM, or a Digital Versatile Disc (DVD) can be used.

Not only a case where the functions of the above exemplary embodiments are achieved by executing the program code read by the computer, but also a case where an OS operating on the computer based on an instruction from the program code performs a part or all of actual processing, and the functions of the above exemplary embodiments are achieved by the processing is included.

Further, a case where, after the program code read from the storage medium is written to a memory included in a function extension board inserted into the computer or a function extension unit connected to the computer, a CPU included in the function extension board or the function extension unit performs a part or all of actual processing based on an instruction from the program code, and the functions of the above exemplary embodiments are achieved by the processing is also included.

According to the present exemplary embodiment, it is possible to provide an appropriate UI as an extension application that extends the function of a standard driver.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-121181, filed Jul. 29, 2022, which is hereby incorporated by reference herein in its entirety.

What is claimed is:

1. An information processing apparatus including an application that extends a function provided by print data generation software used in common by a plurality of different printing apparatuses, the information processing apparatus comprising:
one or more memories; and
a processor in communication with the one or more memories,
wherein the one or more memories and the processor are configured to:

acquire information regarding a connecting form and a printing method of a printing apparatus connected to the information processing apparatus, the connecting form indicating that the printing apparatus is connected to the information processing apparatus via a server or not via the server, the printing method being inkjet printing and laser beam printing; and cause a display unit to display a screen having a different configuration based on the acquired information, the screen having a button of a different name for the same function based on the printing method.

2. The information processing apparatus according to claim 1, wherein in a case where the connecting form is a first connecting form, the one or more memories and the processor are further configured to cause the display unit to display an item for starting a predetermined function, and in a case where the connecting form is a second connecting form, the one or more memories and the processor are further configured to cause the display unit not to display the item for starting the predetermined function.

3. The information processing apparatus according to claim 2, wherein the predetermined function is a remote user interface (UI).

4. The information processing apparatus according to claim 2, wherein the first connecting form is Local Print, and the second connecting form is Universal Print.

5. The information processing apparatus according to claim 4, wherein the first connecting form is printing using an Internet Printing Protocol (IPP) Class Driver, and the second connecting form is printing using a Universal Print (UP) Class Driver.

6. The information processing apparatus according to claim 1, wherein the screen includes a first button named marginless printing in a case where the printing method is inkjet printing, wherein the screen includes a second button named expanding printing area in a case where the printing method is laser beam printing, and wherein the first button and the second button indicate the same function.

7. An information processing method for an information processing apparatus including an application that extends a function provided by print data generation software used in common by a plurality of different printing apparatuses, the information processing method comprising:

acquiring information regarding a connecting form and a printing method of a printing apparatus connected to the information processing apparatus, the connecting form indicating that the printing apparatus is connected to the information processing apparatus via a server or not via the server, the printing method being inkjet printing and laser beam printing; and displaying a screen having a different configuration based on the acquired information, the screen having a button of a different name for the same function based on the printing method.

8. The information processing method according to claim 7, wherein in the displaying, in a case where the connecting form is a first connecting form, an item for starting a predetermined function is displayed, and in a case where the connecting form is a second connecting form, the item for starting the predetermined function is not displayed.

9. The information processing method according to claim 8, wherein the predetermined function is a remote UI.

10. The information processing method according to claim 8, wherein the first connecting form is Local Print, and the second connecting form is Universal Print.

11. The information processing method according to claim 10, wherein the first connecting form is printing using an IPP Class Driver, and the second connecting form is printing using a UP Class Driver.

12. The information processing method according to claim 7, wherein the screen includes a first button named marginless printing in a case where the printing method is inkjet printing, wherein the screen includes a second button named expanding printing area in a case where the printing method is laser beam printing, and wherein the first button and the second button indicate the same function.

13. A non-transitory storage medium that stores a computer program for controlling a computer, a control method achieved by executing the computer program, comprising:

acquiring information regarding a connecting form and a printing method of a printing apparatus connected to an information processing apparatus, the connecting form indicating that the printing apparatus is connected to the information processing apparatus via a server or not via the server, the printing method being inkjet printing and laser beam printing; and displaying a screen having a different configuration based on the acquired information, the screen having a button of a different name for the same function based on the printing method.

14. The non-transitory storage medium according to claim 13, wherein the screen includes a first button named marginless printing in a case where the printing method is inkjet printing, wherein the screen includes a second button named expanding printing area in a case where the printing method is laser beam printing, and wherein the first button and the second button indicate the same function.

* * * * *